Oct. 21, 1930.   L. P. SIGNER   1,779,192
VEHICLE TOW BAR
Filed March 16, 1929
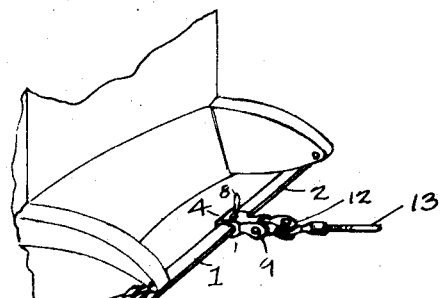
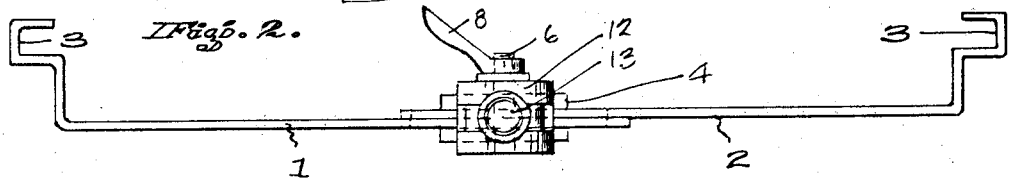
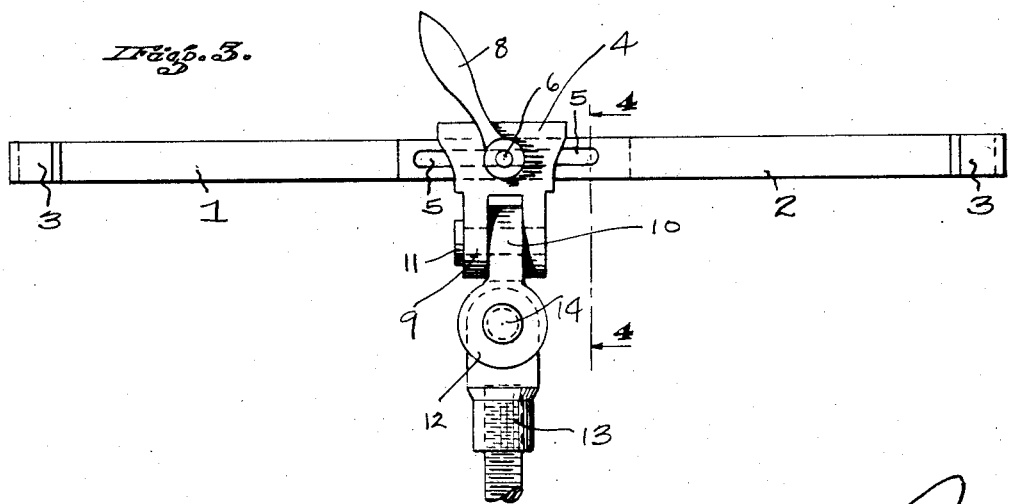
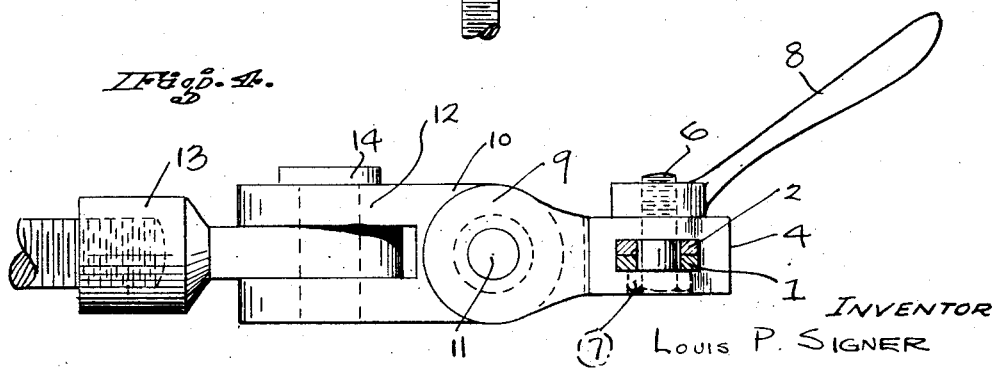
INVENTOR
Louis P. Signer
By Lincoln Johnson Atty.

Patented Oct. 21, 1930

1,779,192

UNITED STATES PATENT OFFICE

LOUIS P. SIGNER, OF SAN FRANCISCO, CALIFORNIA

VEHICLE TOW BAR

Application filed March 16, 1929. Serial No. 347,725.

This invention relates particularly to a bar or clamp to be demountably secured to the front end of a vehicle to facilitate the towing by a suitable towing medium.

An object of the invention is to provide a tow bar, to be detachably secured across the front end of an automotive vehicle, so constructed that said bar will not injure or damage the vehicle in mounting the bar thereon for towing purposes; and a bar that will do away with the necessity of securing the towing structure to the axle or frame of the vehicle or the necessity of elevating one end of the vehicle onto a roller "dolly" on which the said vehicle may be towed.

A further object of the invention is to provide a tow bar for automotive vehicles that is adjustable in its length to fit all sizes of automotive vehicles and which is provided with means to permit of ready adjustment in making ready to tow. Other objects and advantages will appear as this description progresses.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying one sheet of drawings,

Fig. 1 represents a perspective view of the front end of an automotive vehicle, showing the projecting frame ends having a tow bar constructed in accordance with my invention mounted thereon.

Fig. 2 is a front elevation of the tow bar.

Fig. 3 is a plan view of the tow bar shown in Fig. 2.

Fig. 4 is an enlarged view taken through Fig. 3 on the line 4—4.

Disabled automobiles are at the present time made ready to be towed, by passing a tow rope around the frame or axle of the said vehicle or by placing an end of the said vehicle on an auxiliary wheeled vehicle called a "dolly." Either of these methods are objectionable in that the towing power is usually not applied to the towed vehicle at the proper point, when a towing rope is attached thereto, or, if the vehicle to be towed is placed on a "dolly," it usually happens that some portion of the vehicle body or chassis is damaged, due to the inability to get the "dolly" between the automobile and the ground. My invention relates to a tow bar which can be quickly and easily connected across the projecting "goose necks" of the vehicle and readily secured thereto in a practically immovable position, to facilitate an efficient towing operation and to do away with the possibility of damage to any portion of the towed vehicle.

In detail, the invention illustrated in the drawings, comprises a tow bar, formed of complementary bars 1 and 2, each of which are provided with an offset clamp socket or hook 3 on the outer ends thereof, and the opposite ends of said bars are placed one on top of the other and passed through an opening within a clamp housing 4. The clamp housing 4 has the overlapping ends of the bars arranged therein to lie approximately midway between the hook shaped ends 3 of the bars. Each of the over-lapping ends of the bars 1 and 2 are provided with a slot 5 therethrough, and said slots 5 are in registry to permit the passing of a bolt 6 therethrough. The bolt 6 is provided with a hexagon head 7 thereon that lies in a hexagonally shaped socket, cut through the bottom of the clamp housing 4 so that the bolt head will pass into direct contact with the bottom of one of the complementary bars 1 or 2. The end of the bolt 6 is threaded to receive a wing nut or handle 8, which, when turned, draws the head of the bolt into contact with one or the other of the over-lapping bars 1 and 2 and binds said bars in the opening within the clamp frame 4. By unloosening the handle 8, the clamping pressure on the complementary bars 1 and 2 is released so that the said bars can be manually adjusted inwardly or outwardly to increase or diminish the distance between the opposite hooks 3. The front end of the clamp frame 4 is provided with a yoke 9 thereon, within which an eyelet 10 is pivotally held by the pivot pin 11. The eyelet 10 is provided with a fork 12 on the outer end thereof within which a towing socket 13 is pivotally held by the pivot pin 14. The form of connection of the towing socket 13 to the clamp frame 4 permits of universal movement between the towing and towed parts in order to take care of any and all bumpy and inaccurate road conditions that might arise.

In order to apply the tow bar, constructed in accordance with my invention, to the projecting ends of the springs or frame of the vehicle, the operator turns the handle 8 until the bars 1 and 2 can be moved in or out to enable the hooks 3 on the ends of said bars to be passed over and around the springs or vehicle frame ends. The hooks 3 are arranged to hook over the front portion of the springs that are bolted to the projecting frame ends, although it could be clearly within the scope of the invention to clamp the hooks 3 onto the frame ends directly, so that when the bar is drawn the hooks will wedge themselves between the frame ends and spring ends adjacent the point where said members are bolted together. The bars 1 and 2 would then be advanced relatively toward each other, so as to eliminate all lateral play between the bar hooks 3 and the vehicle frame ends, when the bolt 6 would be tightened to clamp the bars 1 and 2 together. The clamp frame 4 that secures the matching faces of the bars 1 and 2 together is arranged centrally between the ends thereof so that the towing force is applied to the towed vehicle at a point where it will act thereon with the greatest efficiency.

Having thus described this invention what I claim and desire to secure by Letters Patent is:

1. A vehicle tow bar comprised of complementary members arranged in longitudinally adjustable engagement and each having an encircling hook on the outer end thereof detachably engageable with the opposite frame ends of a vehicle; a clamp to regulate the longitudinally adjustable engagement of the complementary members; and a towing means pivotally connected to said clamp.

2. A vehicle tow bar comprised of a pair of complementary bars, each having a hook on an end thereof to engage the opposite frame ends of a vehicle and each having the opposite ends thereof provided with slots therein and the said slotted ends arranged in matched engagement; a frame enclosing the matched, slotted ends of said bars; a bolt journaled in said frame and extended through the slotted ends of the bars; a handle on the bolt to bind the matched bar ends into frictional engagement with the frame; and a towing means universally connected to the said frame.

In testimony whereof, I have hereunto set my hand at San Francisco, California, this 5th day of March, 1929.

LOUIS P. SIGNER.